United States Patent
Nodianos et al.

(10) Patent No.: US 8,076,921 B1
(45) Date of Patent: Dec. 13, 2011

(54) SELF-REGULATING POWER SUPPLY FOR MICRO ELECTRONIC MECHANICAL SYSTEMS THERMAL ACTUATORS

(75) Inventors: Kristopher Nodianos, Waldorf, MD (US); Laura Blachek, Charlotte Hall, MD (US); Khoa Nguyen, Alexandria, VA (US); Adedayo Oyelowo, Alexandria, VA (US); Tan Tran, New Bern, NC (US); Bernice Sanford, Bel Alton, MD (US); Kevin Cochran, Falls Church, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 497 days.

(21) Appl. No.: 12/284,475

(22) Filed: Sep. 18, 2008

(51) Int. Cl.
*G05F 3/02* (2006.01)
(52) U.S. Cl. ........................................ 323/304
(58) Field of Classification Search ............... 363/265, 363/275, 277, 279, 282, 284, 285, 304, 351; 73/602, 777; 359/290–295
See application file for complete search history.

(56) References Cited

U.S. PATENT DOCUMENTS

| | | | | |
|---|---|---|---|---|
| 2,134,517 | A * | 10/1938 | Jones | 323/264 |
| 3,577,041 | A * | 5/1971 | Kring et al. | 361/187 |
| 6,853,765 | B1 * | 2/2005 | Cochran | 385/23 |
| 7,158,281 | B2 * | 1/2007 | Chen et al. | 359/291 |
| 7,311,009 | B2 * | 12/2007 | Kotovsky | 73/777 |
| 7,383,732 | B2 * | 6/2008 | Okumura et al. | 73/602 |
| 7,734,430 | B2 * | 6/2010 | Smith | 702/44 |

OTHER PUBLICATIONS

Baker, et al. Final report, Compliant Thermo-Mechanical MEMS Actuators LDRD, Sandia National Laboratories, Dec. 2004.

* cited by examiner

*Primary Examiner* — Adolf Berhane
*Assistant Examiner* — Yemane Mehari
(74) *Attorney, Agent, or Firm* — Fredric J. Zimmerman

(57) ABSTRACT

Systems and methods for a self-regulating power supply for MEMS thermal actuators to achieve maximum actuator displacement while preventing over powering. The present invention includes a power supply configured to regulate electrical input power to a MEMS thermal actuator in order to provide the maximum possible electrical input power. Accordingly, the present invention provides a maximum actuator displacement while preventing device failure from over powering. The present invention utilizes resistivity versus temperature properties for silicon or the like to provide a self-regulating power supply that can be utilized to power a variety of MEMS components without requiring custom actuator control circuits for each type of component.

11 Claims, 4 Drawing Sheets

SELF-REGULATING POWER SUPPLY FOR MICRO ELECTRONIC MECHANICAL SYSTEMS THERMAL ACTUATORS

STATEMENT OF GOVERNMENT INTEREST

The present invention described herein may be manufactured and used by or for the Government of the United States of America for government purposes without the payment of any royalties thereon or therefor.

FIELD OF THE INVENTION

The present invention relates generally to thermal actuators in micro electronic mechanical systems (MEMS). More particularly, the present invention provides systems and methods for a self-regulating power supply for MEMS thermal actuators configured to achieve maximum actuator displacement while preventing over powering.

BACKGROUND OF THE INVENTION

MEMS are miniaturized devices (i.e., micrometer dimensions) that include actuators, sensors, and other electro-mechanical structures. MEMS are typically fabricated by bulk-etching a silicon substrate or depositing layers of polysilicon, oxides, metals, and the like on top of a silicon substrate. Typical MEMS actuation mechanisms include electrostatic, magnetic, and thermal. A MEMS thermal actuator is a micro-mechanical device that typically generates motion by thermal expansion amplification. A small amount of thermal expansion of one part of the device translates to a large amount of deflection of the overall device. MEMS thermal actuators are typically fabricated out of doped single crystal silicon or polysilicon as a complex compliant member.

Thermal actuators are widely used in MEMS devices that require high displacement and/or high force, and are most often implemented in a v-beam, u-beam, or bimorph configuration. In all of these configurations, Joule heating from an applied electrical current causes an actuator material (typically silicon) to expand providing a net displacement of the actuator. It is often desired to operate the actuator at a maximum displacement point. However, if the applied electrical current is increased much beyond a maximum deflection point, the actuator material can melt.

MEMS actuator displacement is conventionally controlled using a switch implementation. When the actuator moves to the desired position, an electronic loop is closed thus providing feedback to inform power supply electronics that the power being provided to the actuator is sufficient. However, for every feedback signal needed to control displacement, there are a set of pads required to feed the signal into the MEMS package and respond with the feedback signal. With multiple actuators on one chip, this could double pin counts in a package, thus increasing real estate. Also, it is not efficient to have to tune each power supply for the actuators.

BRIEF SUMMARY OF THE INVENTION

In various exemplary embodiments, the present invention provides systems and methods for a self-regulating power supply for MEMS thermal actuators to achieve maximum actuator displacement while preventing over powering. The present invention is configured to regulate electrical input power to a thermal actuator in order to provide the maximum possible electrical input power. Accordingly, the present invention provides a maximum actuator displacement while preventing device failure from over powering. The present invention utilizes resistivity versus temperature properties for silicon to provide a self-regulating power supply that can be utilized to power a variety of MEMS components without requiring custom actuator control circuits for each type of component.

In an exemplary aspect, a self-regulating power supply for a micro electronic mechanical systems thermal actuator includes a power source; a monitor configured to monitor voltage and current across a thermal actuator; and a controller connected to the power source and the monitor, where the controller is configured to control power from the power source to the thermal actuator responsive to the monitored voltage and current across the thermal actuator. The self-regulating power supply can further include a converter connected to the power source; and a voltage divider circuit connected to the converter and the thermal actuator, where the converter and the voltage divider circuit are located between the power source and the thermal actuator. The controller is configured to: receive current and voltage measurements from the monitor; and control the voltage through the voltage divider circuit. Optionally, the voltage divider circuit includes a first resistor; a second resistor; and a potentiometer between the first resistor and the second resistor controlled by the controller, where the voltage is controlled responsive to a setting of the potentiometer. The power from the power source is controlled responsive to resistance across the thermal actuator to provide a maximum displacement of the thermal actuator; and the resistance is calculated from the voltage and current monitored across the thermal actuator. Optionally, the controller is configured to ramp voltage across the thermal actuator and determine a maximum resistance point responsive to the monitor as the voltage is ramped. The maximum resistance point may be determined responsive to one of determining a maximum monitored resistance value, determining when a slope of the monitored resistance equals zero, and determining when a trend of decreasing resistance occurs. Optionally, the thermal actuator includes a micro electronic mechanical systems fabricated through micro electronic mechanical systems mechanisms. Alternatively, the thermal actuator includes silicon, where resistivity of the thermal actuator is temperature dependent up to an intrinsic point, the intrinsic point includes a dopant dependent property, and where resistivity of the thermal actuator is at a maximum at the intrinsic point.

In another exemplary aspect, a method of providing self-regulated power to a thermal actuator includes providing an initial voltage to the thermal actuator; monitoring resistance across the thermal actuator; ramping the voltage across the thermal actuator; and setting the voltage across the thermal actuator to a point responsive to the monitored resistance as the voltage is ramped. The monitoring resistance includes monitoring voltage and current across the thermal actuator as the voltage is ramped, and calculating resistance responsive to the monitored voltage and current. Setting the voltage can include providing a voltage for a maximum displacement of the thermal actuator responsive to a maximum resistance across the thermal actuator. Optionally, the maximum resistance point is determined responsive to one of determining a maximum monitored resistance value, determining when a slope of the monitored resistance equals zero, and determining when a trend of decreasing resistance occurs. The method can further include detecting a maximum resistance across the thermal actuator, wherein the setting the voltage across the thermal actuator is responsive to detecting the maximum resistance. Alternatively, the method further includes reducing the voltage across the thermal actuator by a predetermined amount responsive to detecting the maximum resistance.

In yet another exemplary aspect, a micro electronic mechanical systems thermal actuator includes a substrate; a pair of anchors disposed on the substrate; a beam connected to the pair of anchors; and a self-regulating power supply connected to the anchors, where the self-regulating power supply is configured to provide power to the anchors to provide a maximum displacement of the beam responsive to a measured resistance across the beam. The self-regulating power supply can include a power source; a monitor configured to monitor voltage and current across the beam; and a controller connected to the power source and the monitor, where the controller is configured to control power from the power source to the anchors responsive to the monitored voltage and current across the beam. The self-regulating power supply is configured to tune power to the anchors responsive to material characteristics of the anchors and the beam.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for a self-regulating power supply for MEMS thermal actuators to achieve maximum actuator displacement while preventing over powering. The present invention is configured to regulate electrical input power to a thermal actuator in order to provide the maximum possible electrical input power. Accordingly, the present invention provides a maximum actuator displacement while preventing device failure from over powering. The present invention utilizes resistivity versus temperature properties for silicon to provide a self-regulating power supply that can be utilized to power a variety of MEMS components without requiring custom actuator control circuits for each type of component.

Figure 1:
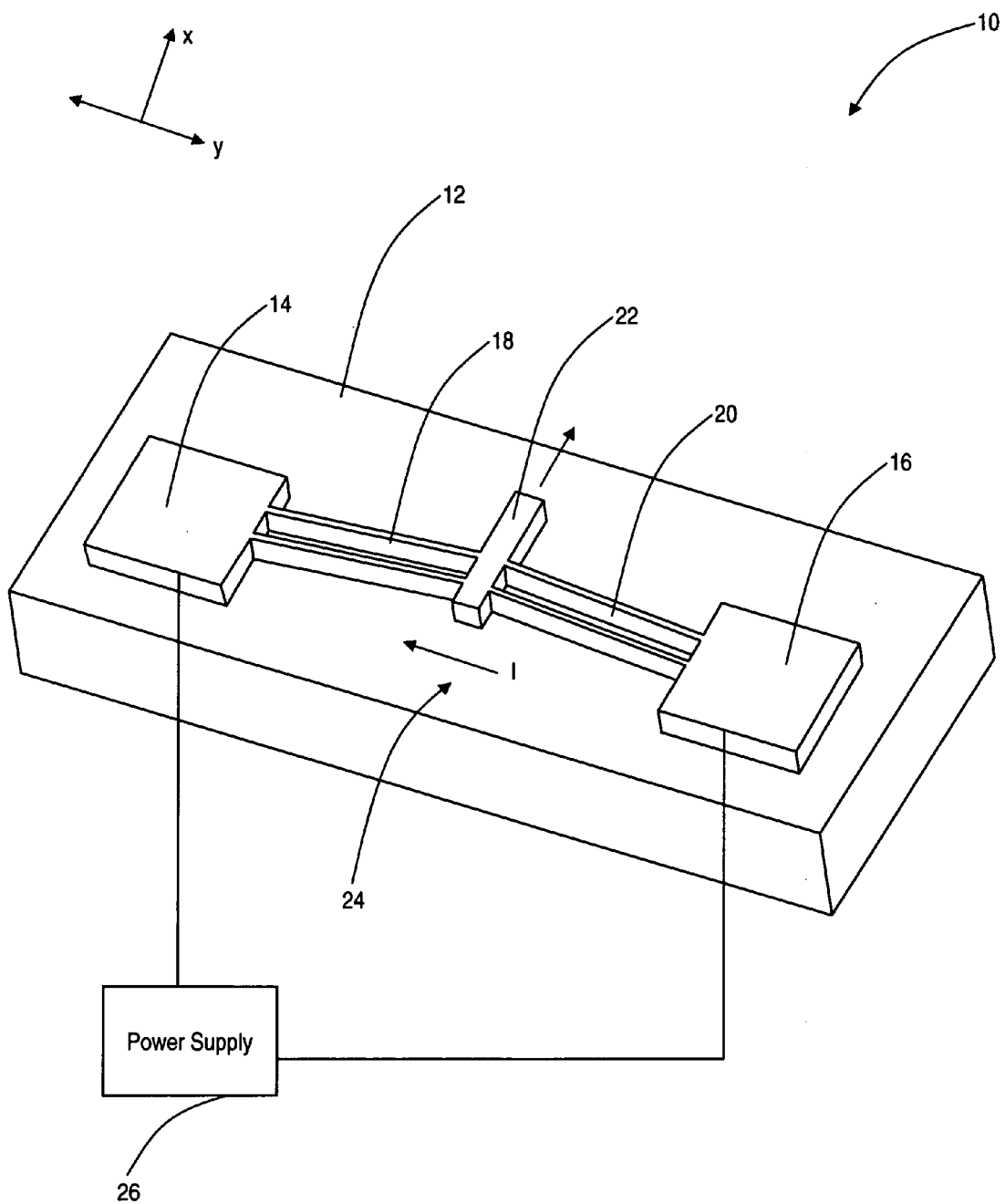
FIG. 1 is a perspective view of a v-beam thermal actuator according to an exemplary embodiment of the present invention.

Referring to FIG. 1, a v-beam thermal actuator 10 is illustrated according to an exemplary embodiment of the present invention. The v-beam thermal actuator 10 can be fabricated utilizing MEMS techniques such as etching a silicon substrate or depositing layers of polysilicon, oxides, metals, etc. on a silicon substrate 12. The v-beam thermal actuator 10 includes anchors 14, 16, v-beams 18, 20, and a yoke 22. An electrical current 24 can be applied between the anchors 14, 16 through the v-beams 18, 20 and the yoke 22 causing the v-beams 18, 20 to increase in temperature due to resistance heating. Accordingly, the temperature rise in the v-beams 18, 20 causes the v-beams 18, 20 to expand in a y-direction. However, because the v-beams 18, 20 are disposed to the anchors 14, 16 and therefore constrained in the y-direction, the v-beams 18, 20 deform and displace along an x-direction. The yoke 22 is disposed to each of the v-beams 18, 20 and correspondingly displaces along the x-direction responsive to the applied electrical current 24. When the applied electrical current 24 is removed, the v-beams 18, 20 return to an initial temperature, contracting back along the x-direction.

In the exemplary embodiment of FIG. 1, the v-beam thermal actuator 10 includes the anchors 14, 16, the v-beams 18, 20, and the yoke 22 formed on a silicon substrate. The anchors 14, 16 can include metal pads for an electrical connection from a power supply 26. The v-beam 18 is connected to the anchor 14 and the yoke 22, and the v-beam 20 is connected to the anchor 16 and the yoke 22. The electrical current 24 can flow from the power supply 26 through the metal pads of the anchor 16 through the v-beam 20, the yoke 22, and the v-beam 18 to the anchor 14.

The v-beam thermal actuator 10 is a v-shaped thermal actuator and is commonly referred to as a "chevron" or "bent-beam" thermal actuator. Other types of thermal actuators include a u-beam configuration, a bimorph configuration, and the like. In a u-beam configuration, heating between a narrow and a wide arm results in an in-place bending of the thermal actuator. In a bimorph configuration, a difference in thermal expansion coefficient results in an out-of-place bending of the thermal actuator. The systems and methods of the present invention contemplate utilizing these other types of thermal actuator configurations.

The power supply 26 can automatically determine a maximum deflection point of a MEMS thermal actuator, such as the v-beam thermal actuator 10, by monitoring electrical resistance across the actuator as electrical power to the actuator is increased (and the actuator temperature increases). This ability is due to the fact that the resistivity (and thus the resistance across an element) of silicon (as well as other materials) is temperature dependent.

Figure 2:
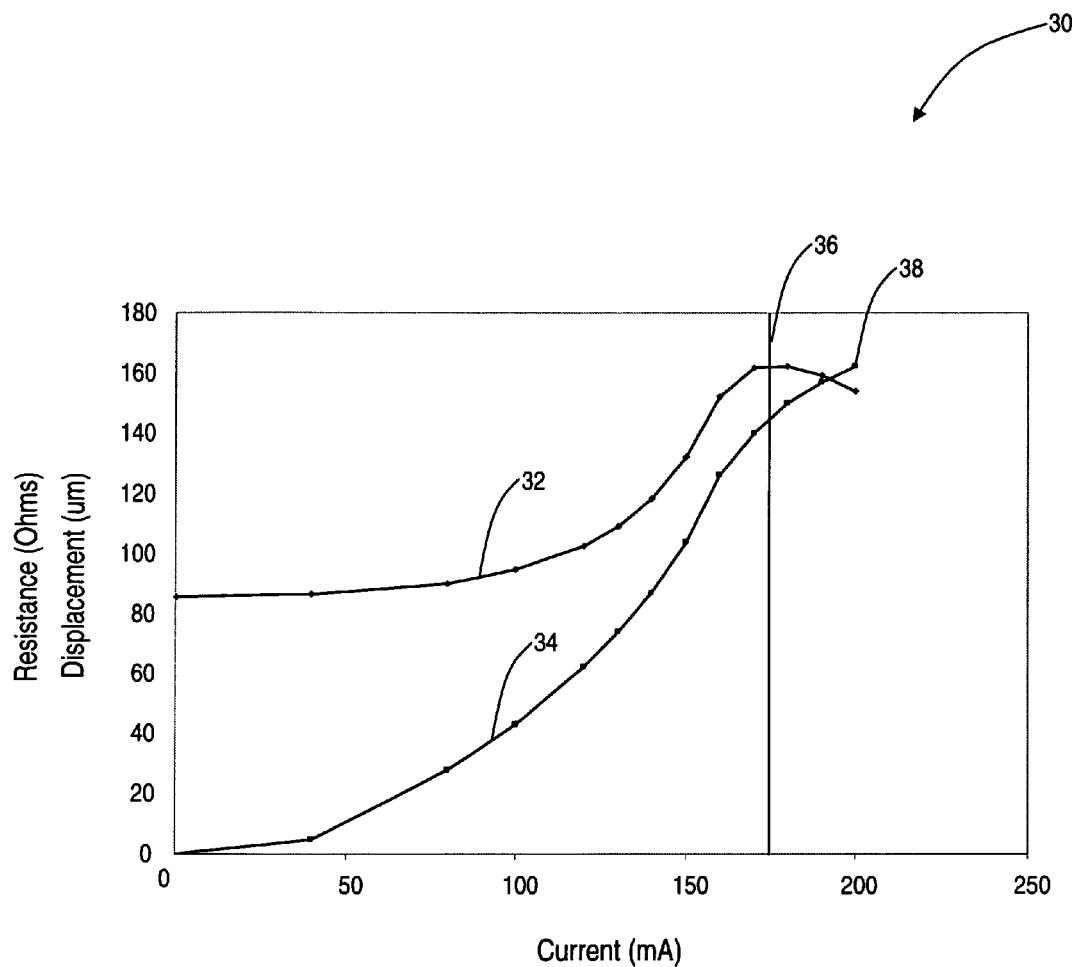
FIG. 2 is a graph of electrical resistance and actuator displacement for a v-beam actuator versus an applied electrical current according to an exemplary embodiment of the present invention.

Referring to FIG. 2, a graph 30 illustrates resistance (curve 32) and displacement (curve 34) for a v-beam actuator versus an applied electrical current according to an exemplary embodiment of the present invention. The graph 30 shows values for a v-beam actuator fabricated with silicon for illustration purposes, and those of ordinary skill in the art will recognize similar resistance and displacement values versus applied electrical current could be achieved with other material types.

Silicon (and other material types) demonstrates a positive temperature coefficient of resistivity up to an intrinsic temperature point 36, as shown by the curve 32. The intrinsic temperature point 36 is a dopant-level dependent property. In this range, the slope of the actuator displacement versus the applied current curve 32 increases as the applied current increases. At the intrinsic temperature point 36, the resistivity (curve 32) is at a maximum. When the intrinsic temperature is exceeded in the v-beam, the silicon demonstrates a negative temperature coefficient of resistivity and the slope of the displacement versus current curve 32 begins to decrease as the applied current increases. When the current is increased further beyond the intrinsic temperature point 36, the actuator fails due to melting (i.e., point 38 on curve 34). Accordingly, the intrinsic temperature point 36 can be utilized as a maximum operational temperature of the thermal actuator and the corresponding current at the intrinsic temperature point 36 can be regarded as the maximum operational current.

The power supply 26 is configured to provide the applied electrical current 24 based on resistance up to the intrinsic temperature point 36. The power supply 26 can include a monitor circuit which is configured to continuously calculate the resistance of the actuator and vary electrical current and power accordingly until an optimal displacement is obtained. This design utilizes material characteristics of the actuator to control power and displacement. Advantageously, this design avoids a requirement to provide a custom power supply for MEMS thermal actuators with different specifications, different sizes, or different manufacturing variances. For example, voltage and current requirements may vary from chip to chip and even between devices on the same chip. It is cost prohibitive to manufacture actuator control circuits on a chip by chip basis.

In an exemplary embodiment, the power supply 26 may include a self-regulating actuator power supply for use in a MEMS safety and arming (S&A) system. For example, the MEMS S&A system can utilize thermal actuators to align optical fibers. This MEMS S&A system can provide safety features in the form of locks through the thermal actuators which do not align the optical fibers until a certain series of command and environmental events have occurred. In conventional systems, these locks are controlled by power that is generated by external circuitry. The power supply 26 of the present invention provides the ability to set the voltage output of a DC-DC converter used to power the thermal actuators. Advantageously, this invention enables varying tolerances due to environment changes, manufacturing variance, etc. that can cause the power requirements for the thermal actuators to change. In this example, displacement of the thermal actuators is sensitive to the voltage and current levels used to power them. Therefore, varying from the recommended voltage of the actuator could cause over or under powering of the device and ultimately reduce the efficiency of the optical system. The power supply 26 includes a monitor component which is configured to optimize powering responsive to the resistivity of the thermal actuator.

Figure 3:
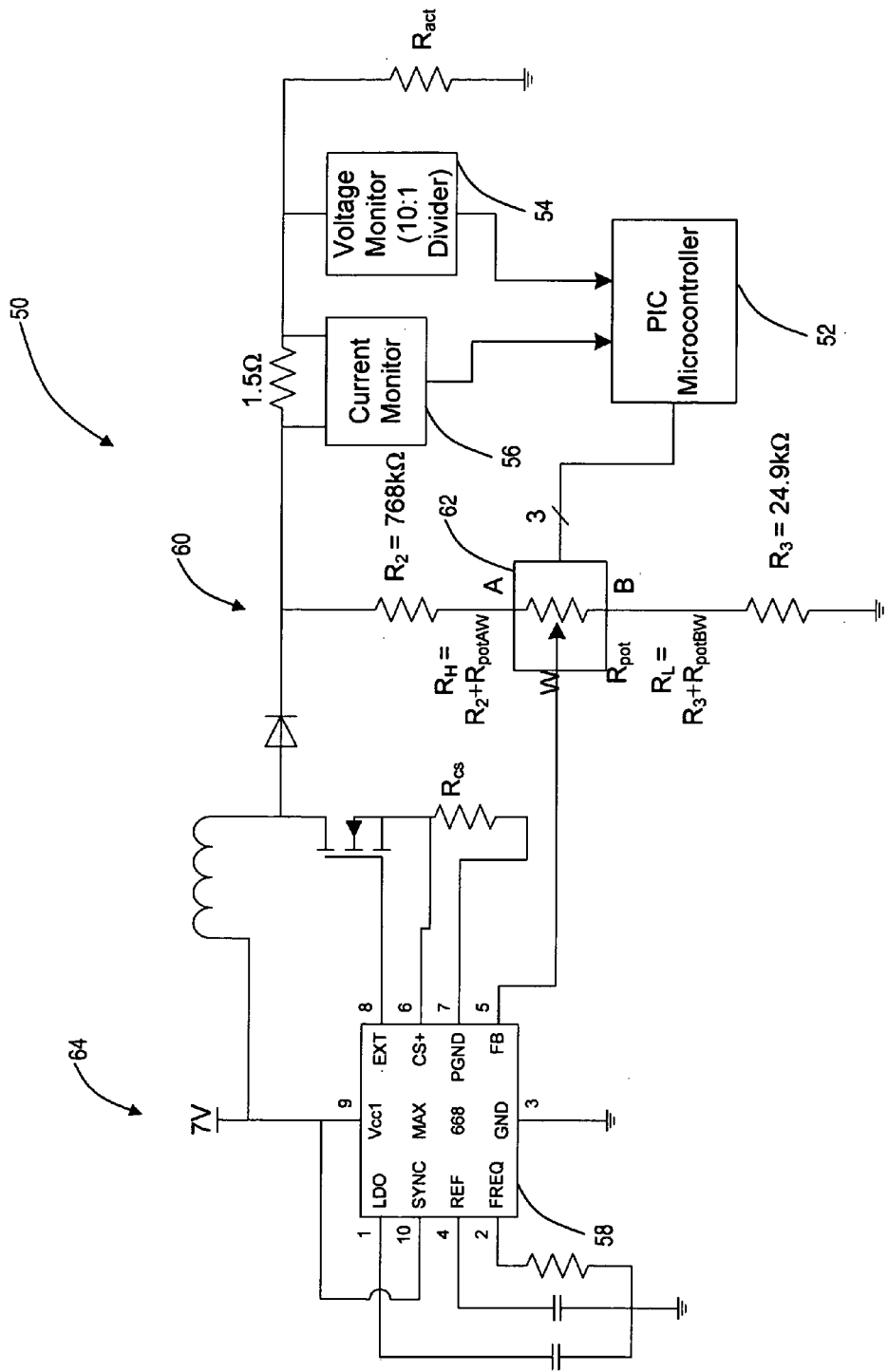
FIG. 3 is a diagram of a self-regulated power supply for a MEMS thermal actuator according to an exemplary embodiment of the present invention.

Referring to FIG. 3, a self-regulated power supply 50 for a MEMS thermal actuator is illustrated according to an exemplary embodiment of the present invention. The self-regulated power supply 50 is configured to monitor resistance and to ramp voltage accordingly. The self-regulated power supply 50 includes a microcontroller 52, a voltage monitor 54, current monitor 56, and a DC-DC converter 58. The DC-DC converter 58 can include several connections to transistors, inductors, resistors, etc.

The design of the self-regulated power supply 50 implements a voltage ramping circuit to increase the power delivered to the thermal actuators. To achieve the voltage ramp, the DC-DC converter 58 uses a voltage divider feedback 60 from the output voltage of the converter is employed. One resistor, $R_{pot}$, 62 of the voltage divider 60 is a digital potentiometer that is varied in value. One side of the potentiometer 62 increases in value while the other decreases. This decrease and increase in resistance increases the output voltage of the converter 58. For example, the converter 58 can control up to 20 W power levels and the converter 58 can be a MAX668 (a constant-frequency, pulse-width modulating (PWM), current-mode DC-DC controller) from Maxim Integrated Products. The MAX668 provides a low voltage input and boost the output to the desired voltage. For example, an input supply voltage 64 can be 7V, and MEMS thermal actuator input voltages can include ranges from approximately 22V to 40V. Additionally, the MAX668 does not operate when the internal clock signal of the chip is disabled by an external trigger signal. With no internal clock signal, the MAX668 does not ramp the output voltage or maintain the desired voltage. This feature may be used when the thermal actuator does not need to be powered. Power consumption to the thermal actuator can be reduced by maintaining the converter 58 in the off state if possible when not in use.

The main purpose of the voltage divider feedback 60 is the ability to ramp the output voltage. This result is achieved by changing the resistance of the potentiometer 62 situated in the middle of a voltage divider on the output of the converter 58. The voltage divider 60 includes a resistor, $R_H$, which is equal to the combined resistance of the $R_{PotAW}$ 62 and a resistor, $R_2$, and a resistor, $R_L$, which is equal to the combined resistance of the $R_{potBw}$ 62 and a resistor, $R_3$. The output voltage based on the voltage divider feedback 60 can be calculated using the following equation:

$$R_H = R_L\left[\left(\frac{V_{out}}{V_{ref}}\right) - 1\right] \quad (1)$$

Where $R_H$ and $R_L$ construct the voltage divider and $V_{ref}$ is defined by the converter 58 (e.g., $V_{ref}$ can equal 1.25V for the MAX668). From equation (1), $V_{out}$ is linearly related to the value of $R_H$ with $R_2$ being a static value. $V_{out}$ is also inversely proportional to $R_L$ with $R_3$ being a static value. $V_{out}$ linearly increases with the increase of $R_H$. In an exemplary embodiment, $R_2$ can be constructed with a static resistor of minimum value 768 k Ohms and a digital potentiometer in series and choosing $R_3$ equal to 24.9 k Ohms with the opposite end of the digital potentiometer in series sets the output voltage to 44V when the digital potentiometer, $R_{pot}$, 62 is set appropriately. This configuration gives a 10% tolerance of the highest voltage level recorded by the thermal actuator.

The digital potentiometer, $R_{pot}$, 62 is used to set $R_L$ at a high resistance and $R_H$ at a low resistance therefore outputting an initial low voltage to the thermal actuator. The voltage level, which is supplied to thermal actuator at initialization is not enough power to thermally heat the actuator enough to cause displacement. The digital potentiometer, $R_{pot}$, 62 may be set to reduce the resistance on a clock pulse, i.e., reducing the resistance of $R_L$ increases the output voltage of the converter 58. The clock pulse may be outputted to the digital potentiometer, $R_{pot}$, 62 from the microcontroller 52.

The self-regulated power supply 50 is configured to measure displacement of the thermal actuator responsive to resistivity as the resistance is reduced in $R_L$ due to the digital potentiometer, $R_{pot}$, 62. The voltage monitor 54 is configured to monitor a voltage across the thermal actuator, i.e. voltage across $R_{act}$, and the current monitor is configured to monitor a current across the thermal actuator, i.e. current across $R_{act}$, and collectively, these measurements can be utilized to determine the resistance $R_{act}$.

The microcontroller 52 can be utilized to calculate the slope of a tangent line associated with measurements of $R_{act}$, i.e. the tangent line of the resistance (curve 32 in FIG. 2). Once the slope equals zero, i.e. maximum resistance has been measured, the oscillator used to increase the resistance of the digital potentiometer, $R_{pot}$, 62 of the DC-DC converter 58 can be turned off. The microcontroller 52 is able to control power to the actuator by controlling the output of the DC-DC converter 58. The power source is a set input supply to the circuit determined by outside requirements. Alternatively, the maximum resistance can also be measured when a maximum resistance value is measured, when a decreasing resistance trend is observed, and the like.

The maximum efficiency displacement can be at a different point from when the slope equals zero. For example, in one system design, Applicants have determined that the maximum efficiency displacement was at a power input to the thermal actuator of approximately 10-15% less power than when the slope of the resistance versus current curve equals zero. Accordingly, the converter 58 can reduce the resistance of the potentiometer, $R_{pot}$, 62 to cut the voltage level back 10-15% and hold the voltage at that output level responsive to finding the slope equal to zero. Note, this determination can be made for various different applications, and the power input setting adjusted accordingly in the microcontroller 52.

Figure 4:
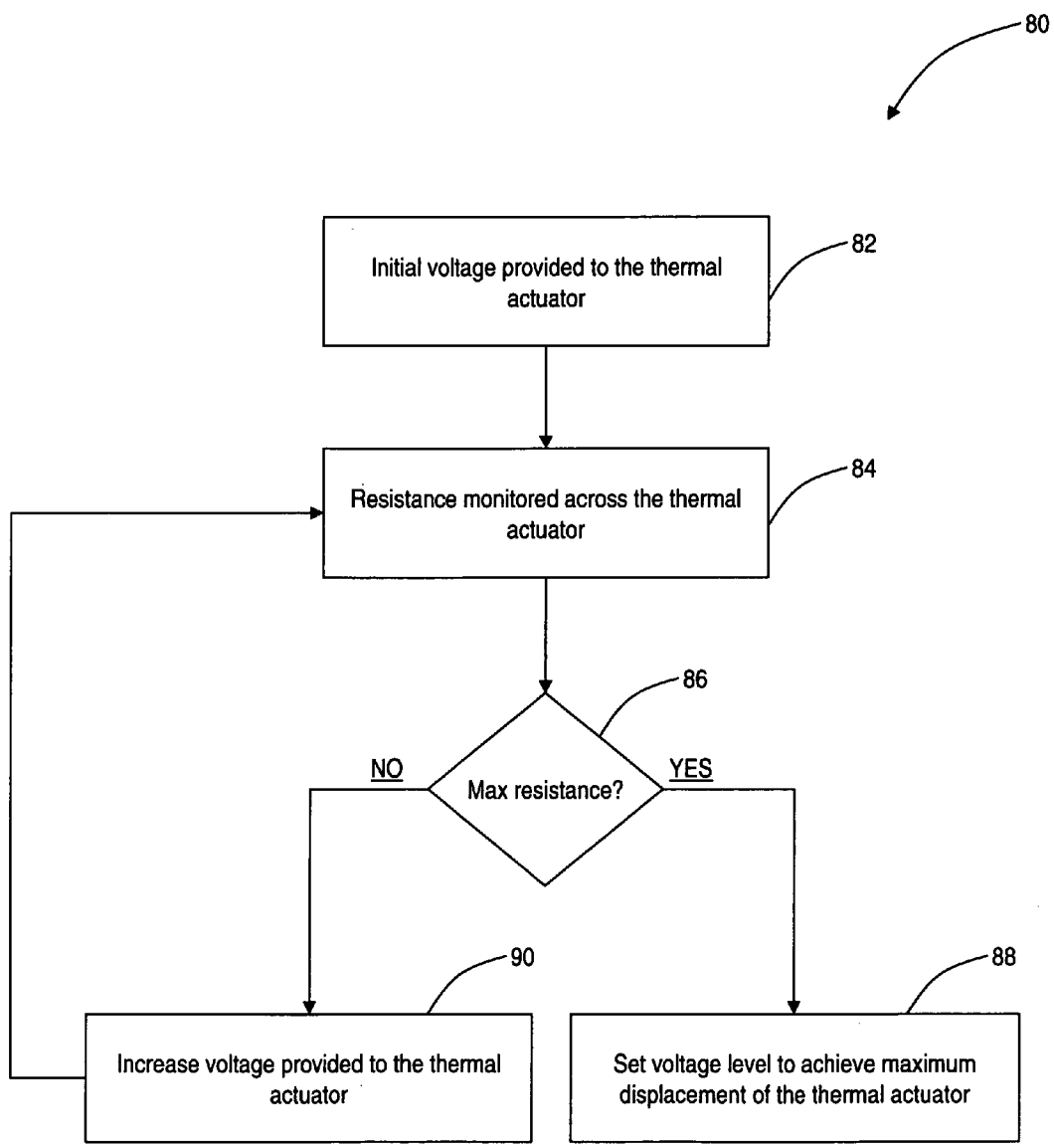
FIG. 4 is a flowchart of a mechanism for self-regulating power to a MEMS thermal actuator according to an exemplary embodiment of the present invention.

Referring to FIG. 4, a flowchart illustrates a mechanism 80 for self-regulating power to a MEMS thermal actuator according to an exemplary embodiment of the present invention. The mechanism 80 allows for self-regulating power to be supplied to any MEMS thermal actuator without requiring a power supply tuned to each particular type of thermal actuator. The mechanism 80 can be implemented in the microcontroller 58 or the like responsive to inputs from the voltage monitor 54, the current monitor 56, and the like and outputs to a programmable variable resistor or the like to adjust input voltage and current to the thermal actuator.

The mechanism 80 includes providing an initial voltage to the thermal actuator (step 82). The initial voltage is set to a low voltage to initiate displacement of the thermal actuator. Resistance is monitored across the thermal actuators (step 84). Here, the resistance is measured across, for example, the v-beams, u-beams, or the like of the thermal actuator. This measurement may taken through monitoring current, voltage, or the like and calculating.

The monitored resistance is checked to determine if a maximum resistance is seen across the thermal actuator (step 86). The maximum resistance can be determined through checking each monitored value, monitoring a slope of the resistance curve to determine when it equals zero, monitoring for a decreasing resistance trend, or the like. If the maximum resistance is reached (step 86), then the voltage level is set to achieve maximum displacement of the thermal actuator (step 88). As described herein, the maximum efficiency displacement can be at a different point from maximum resistance. Accordingly, the voltage level can be scaled back a predetermined amount or left alone at maximum resistance. If the maximum resistance is not reached (step 86), then the voltage is increased to the thermal actuator (step 90), and the mechanism 80 continues to monitor the resistance across the thermal actuator (step 84).

The present invention may be utilized in MEMS S&A system applications. Additionally, the present invention can be used in MEMS devices that require thermal actuator control where size and space may constrict use of electrical feedback signals (such as from a mechanical switch closure). Further, the present invention is applicable where the thermal actuator characteristics directly relate to electrical supply or output characteristics.

Advantageously, the present invention eliminates the use of open feedback switches for MEMS thermal actuators and it reduces test time by eliminating a requirement of manually tuning power supplies. Also, the present invention can minimize real estate and complexity of a MEMS actuator chip and reduce pin counts on MEMS packaging. This configuration allows for standardized circuit boards across MEMS chips and for "drop-in" replacement of MEMS chips.

Although the present invention has been illustrated and described herein with reference to exemplary embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A self-regulating power supply for a micro electronic mechanical systems thermal actuator, comprising:
   a power source;
   a monitor being configured to monitor voltage and current across a thermal actuator; and
   a controller being connected to the power source and the monitor,
      wherein the controller is configured to control power from the power source to a thermal actuator responsive to the monitored voltage and current across the thermal actuator,
      wherein the power from the power source is controlled responsive to resistance across the thermal actuator to provide a maximum displacement of the thermal actuator,
      wherein the resistance is calculated from the voltage and current monitored across the thermal actuator,
      wherein the controller is configured to ramp voltage across the thermal actuator and determine a maximum resistance point responsive to the monitor as the voltage is ramped, and
      wherein the maximum resistance point is determined responsive to one of determine a maximum monitored resistance value, determine when a slope of the monitored resistance equals zero, and determine when a trend of decreasing resistance occurs.

2. The self-regulating power supply of claim 1, further comprising a converter being connected to the power source; and
   a voltage divider circuit being connected to the converter and the thermal actuator,
      wherein the converter and the voltage divider circuit are located between the power source and the thermal actuator.

3. The self-regulating power supply of claim 2, wherein the controller is configured to receive current and voltage measurements from the monitor, and control the voltage through the voltage divider circuit.

4. The self-regulating power supply of claim 2, wherein the voltage divider circuit comprises a first resistor, a second resistor; and a potentiometer situated between the first resistor and the second resistor controlled by the controller, and
      wherein the voltage is controlled responsive to a setting of the potentiometer.

5. The self-regulating power supply of claim 1, wherein the controller is configured to ramp voltage across the thermal actuator and determine a maximum resistance point responsive to the monitor as the voltage is ramped.

6. The self-regulating power supply of claim 1, wherein the thermal actuator comprises a micro electronic mechanical systems fabricated through micro electronic mechanical systems mechanisms.

7. The self-regulating power supply of claim 6, wherein the thermal actuator comprises silicon, wherein resistivity of the thermal actuator is temperature dependent up to an intrinsic point, the intrinsic point comprises a dopant dependent property, and wherein resistivity of the thermal actuator is at a maximum at the intrinsic point.

8. A method of providing self-regulated power to a thermal actuator, comprising:

providing an initial voltage to the thermal actuator;

monitoring resistance across the thermal actuator;

ramping the voltage across the thermal actuator; and setting the voltage across the thermal actuator to a point responsive to the monitored resistance as the voltage is ramped, wherein said setting the voltage comprises providing a voltage for a maximum displacement of the thermal actuator responsive to a maximum resistance across the thermal actuator, and wherein the maximum resistance point is determined responsive to one of determining a maximum monitored resistance value, determining when a slope of the monitored resistance equals zero, and determining when a trend of decreasing resistance occurs.

9. The method of claim 8, wherein the monitoring resistance comprises monitoring voltage and current across the thermal actuator as the voltage is ramped, and calculating resistance responsive to the monitored voltage and current.

10. The method of claim 8, further comprising detecting a maximum resistance across the thermal actuator, wherein the setting the voltage across the thermal actuator is responsive to detecting the maximum resistance.

11. The method of claim 10, further comprising reducing the voltage across the thermal actuator by a predetermined amount responsive to detecting the maximum resistance.

* * * * *